Oct. 9, 1923.
E. W. BAXTER
ACCELERATOR FOR AUTOMOBILES
Filed Dec. 30, 1921 2 Sheets-Sheet 1
1,470,211
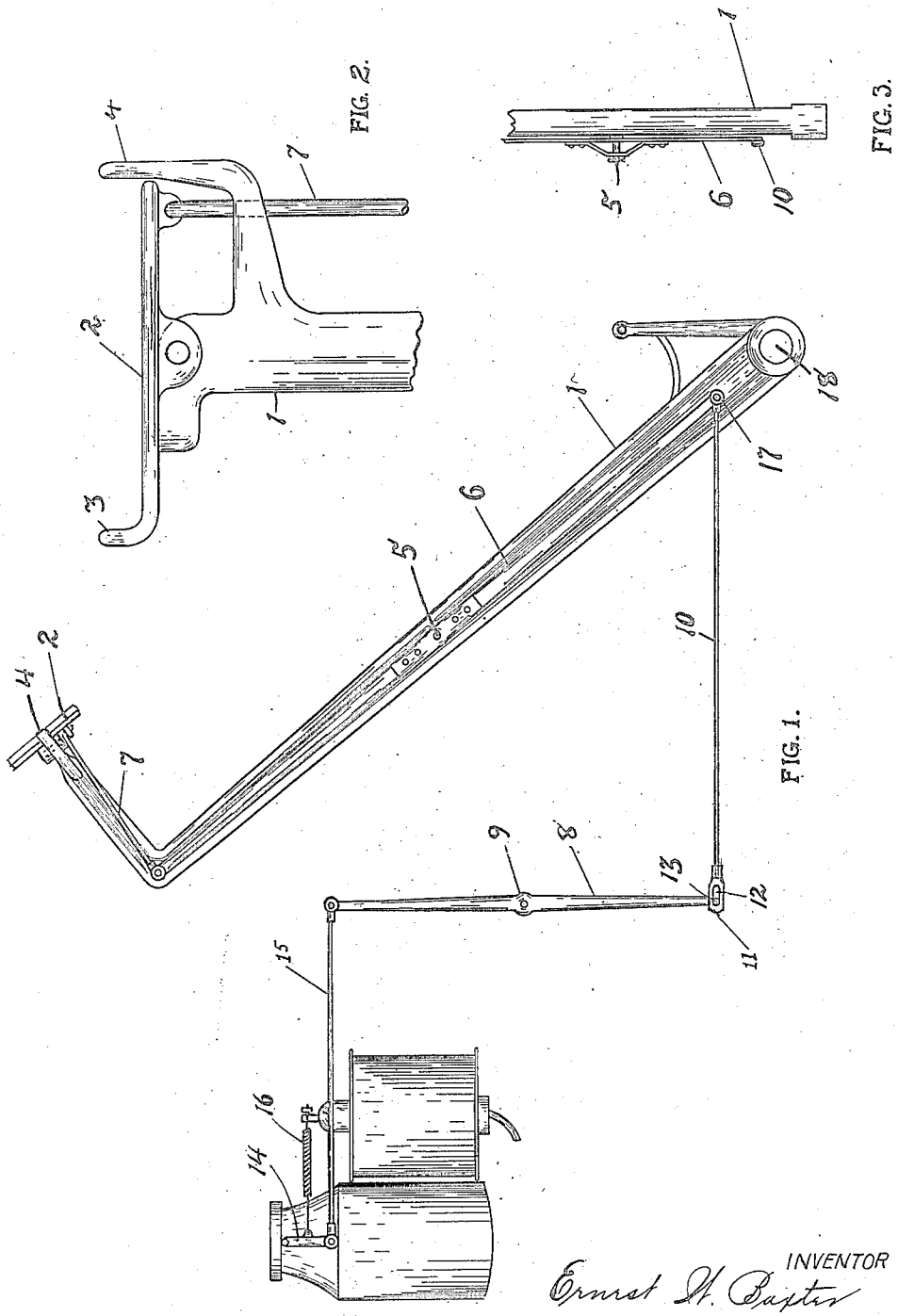
INVENTOR
Ernest W. Baxter
BY
H. G. Burns
ATTORNEY

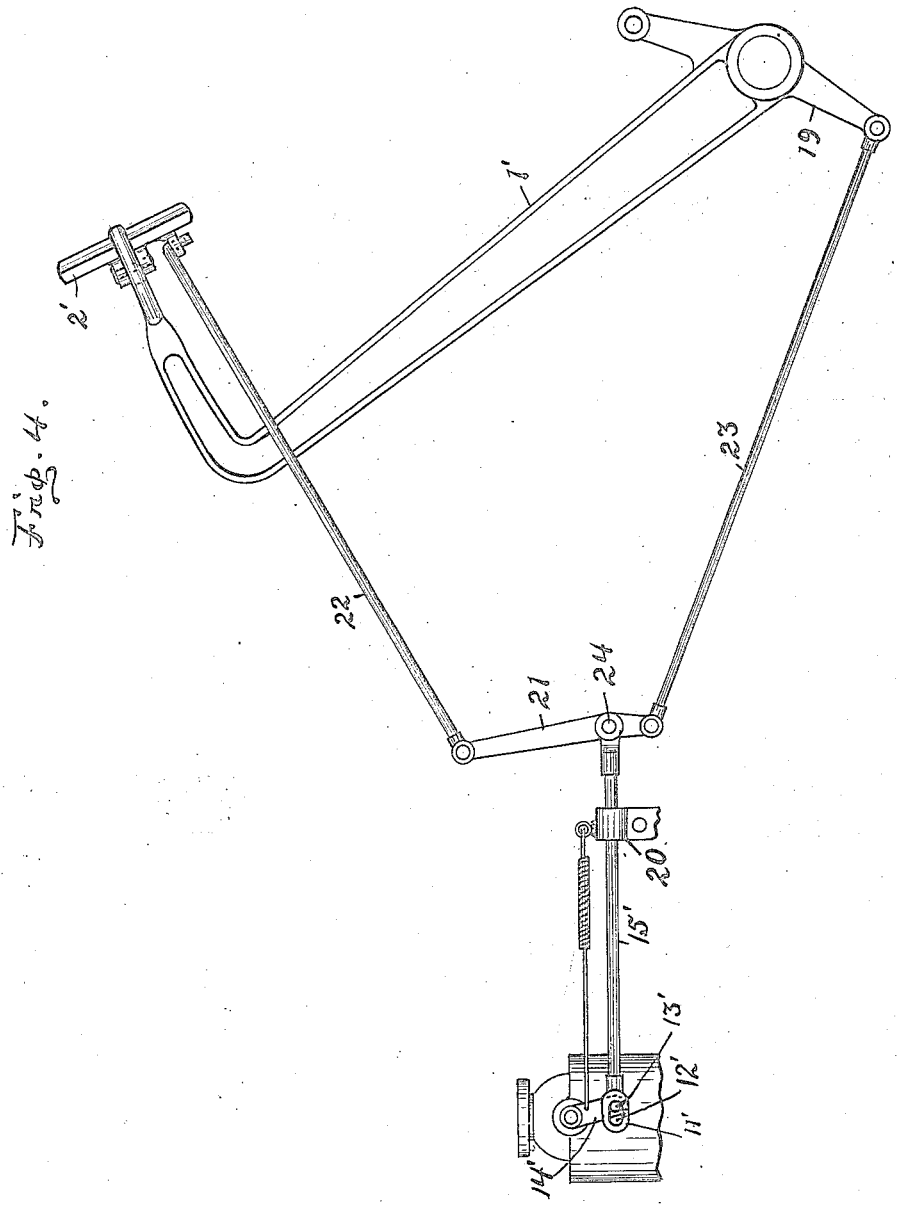

Patented Oct. 9, 1923.

1,470,211

UNITED STATES PATENT OFFICE.

ERNEST W. BAXTER, OF VAN WERT, OHIO.

ACCELERATOR FOR AUTOMOBILES.

Application filed December 30, 1921. Serial No. 526,023.

*To all whom it may concern:*

Be it known that I, ERNEST W. BAXTER, a citizen of the United States of America, and resident of Van Wert, in the county of Van Wert and State of Ohio, have invented certain new and useful Improvements in Accelerators for Automobiles, of which the following is a specification.

This invention relates to improvements in accelerators for automobiles and the object thereof is to provide means controlled by the foot of the operator in conjunction with the service brake or the clutch pedal of the automobile for regulating the throttle of the engine to permit of effecting a quick stop in the case of an emergency, to facilitate the control of the car and its engine, and to enable the operator to accelerate the engine while holding the car on a grade under the control of his feet.

These objects of the invention are accomplished by the construction illustrated in the accompanying drawings in which:

Fig. 1 is a side elevation including the service brake foot lever, the engine throttle, and the accelerator mechanism in relation therewith;

Fig. 2 is a detail view showing the pivoted pedal in connection with the service brake lever by means of which the lever and accelerator are operated;

Fig. 3 is a detail view showing the supporting relation between the rocking beam and the service brake lever; and Fig. 4 is a side elevation of the service brake lever, the engine throttle, and the accelerator applied thereto in a modified form.

The characters appearing in the description refer to parts shown in the drawings and designated thereon by corresponding characters:

The invention, comprising the mechanism for controlling the engine throttle, may be applied to either the service brake lever or clutch lever of an automobile and is intended to enable the operator to manipulate the engine throttle with his foot while operating either the service brake lever or the clutch lever as the case may be. The invention, while applicable to either the service brake or the clutch lever, is shown in the drawings and referred to in the description as applied to the service brake lever.

In the present instance the service brake lever 1 has pivoted thereto at its upper end a pedal 2 so as to have lateral tilting movement, one side of the pedal having an upturned guard 3 and the lever having an upwardly projecting guard 4 adjacent the other side of the pedal. On one side of the brake lever is a stud 5 upon which is pivotally supported a rocking beam 6, the upper end of which has actuated relation with the pedal 2 through the medium of a connecting rod 7. The lower end of the beam has actuating relation with an intermediate lever 8 which is supported upon a pivot 9, there being a connecting rod 10 for imparting movement from the beam to the lever. The connecting rod 10 has at one end thereof a head 11 with an elongated slot 12 therein through which a pin 13 extends from the adjacent end of the lever 8, the purpose of the slot being to admit of limited play between the connecting rod and the lever. The upper end of the lever 8 has actuating relation with the throttle lever 14 by means of a connecting rod 15, and a retracting spring 16 has connection with the throttle lever tending to hold it in closed position.

The service brake lever is mounted and actuated in the customary manner, and in the present instance the brake lever is actuated by applying pressure with the foot upon the pedal 2, as usual. By tilting the pedal laterally, however, the engine throttle lever 14 is actuated accordingly at any stage of movement of the brake lever. It is the intention to so proportion and arrange the various parts connecting the pedal and the throttle lever that movement will be imparted to the throttle lever only when the pedal is tilted and not by movements of the brake lever. Thus, the connection 17 between the beam 6 and the connecting rod 10 is located eccentric to the fulcrum 18 of the brake lever, and also, the head 13 on the connecting rod 10 is slotted to admit of limited lost motion between the connecting rod and the intermediate lever which circumvent movement being imparted to the engine throttle through the movement of the brake lever.

In the form shown in Fig. 4 the brake lever 1' has pivoted thereon a pedal 2' as in the former instance, and has also a pendant arm 19. The throttle lever 14' has actuated relation with a sliding bar 15' that is supported in a bracket 20. The bar has a head 11' with an elongated slot 12' therein in which a pin 13' extends from the throttle lever and has limited play therein. On the opposite end of the sliding bar is pivotally supported a vertically disposed rocking member 21, the upper end of which has actuated relation with the pedal 2' through the medium of a connecting rod 22, and the lower end of the rocking member has actuated relation with the pendant arm 19 on the brake lever through the medium of another connecting rod 23. The pivotal connection 24 between the sliding bar and the rocking member is so located, and the action imparted to the rocking member through the connecting rods by movements of the brake lever is such that no consequent movement is thereby imparted to the sliding bar. However, when the pedal 2' is tilted laterally movement is imparted to the sliding bar 15' through the medium of the rocking member 21 and the connecting rod 22 so that the throttle lever is manipulated accordingly.

In the operation of the invention the brake lever may be manipulated independently of any movement imparted to the throttle, or, the throttle may be controlled by manipulating the pedal without actuating the brake lever. By this arrangement both the throttle and the brake are brought under the control of one foot of the operator without necessitating removal of the foot from the pedal.

What I claim is:—

1. In combination with the service brake lever of an automobile and the throttle thereof, a pedal pivoted on the brake lever and having movement relative thereto; a movable member having actuating relation with the throttle; and a rocking member having pivotal support on the movable member and actuated relation at its opposite ends respectively with the pedal and the brake lever so that the throttle is operable by tilting movement of the pedal and inoperable by movement of the brake lever.

2. In combination with the service brake lever of an automobile and throttle thereof, a pedal pivoted on the lever at its upper end so as to have lateral tilting movement thereon; a guard on the lever projecting upwardly adjacent one side of the pedal; a movable member having actuating relation with the throttle; and a rocking member having pivotal connection with the movable member and actuated relation at its opposite ends respectively with the pedal and the brake lever so that the throttle is operable by tilting movement of the pedal and inoperable by the movement of the brake lever.

3. In combination with the service brake lever of an automobile and throttle thereof, a pedal pivoted on the lever at its upper end so as to have lateral tilting movement thereon; a guard on the lever projecting upwardly adjacent one side of the pedal; and a mechanism connecting the pedal and the engine throttle for actuating the throttle by the tilting movement of the pedal.

In testimony whereof I affix my signature, in presence of two witnesses.

ERNEST W. BAXTER.

Witnesses:
 GRACE LA RUE,
 S. E. WALTERS.